May 4, 1965  E. BAILEY  3,181,582
SLICER
Filed May 10, 1962  3 Sheets-Sheet 2

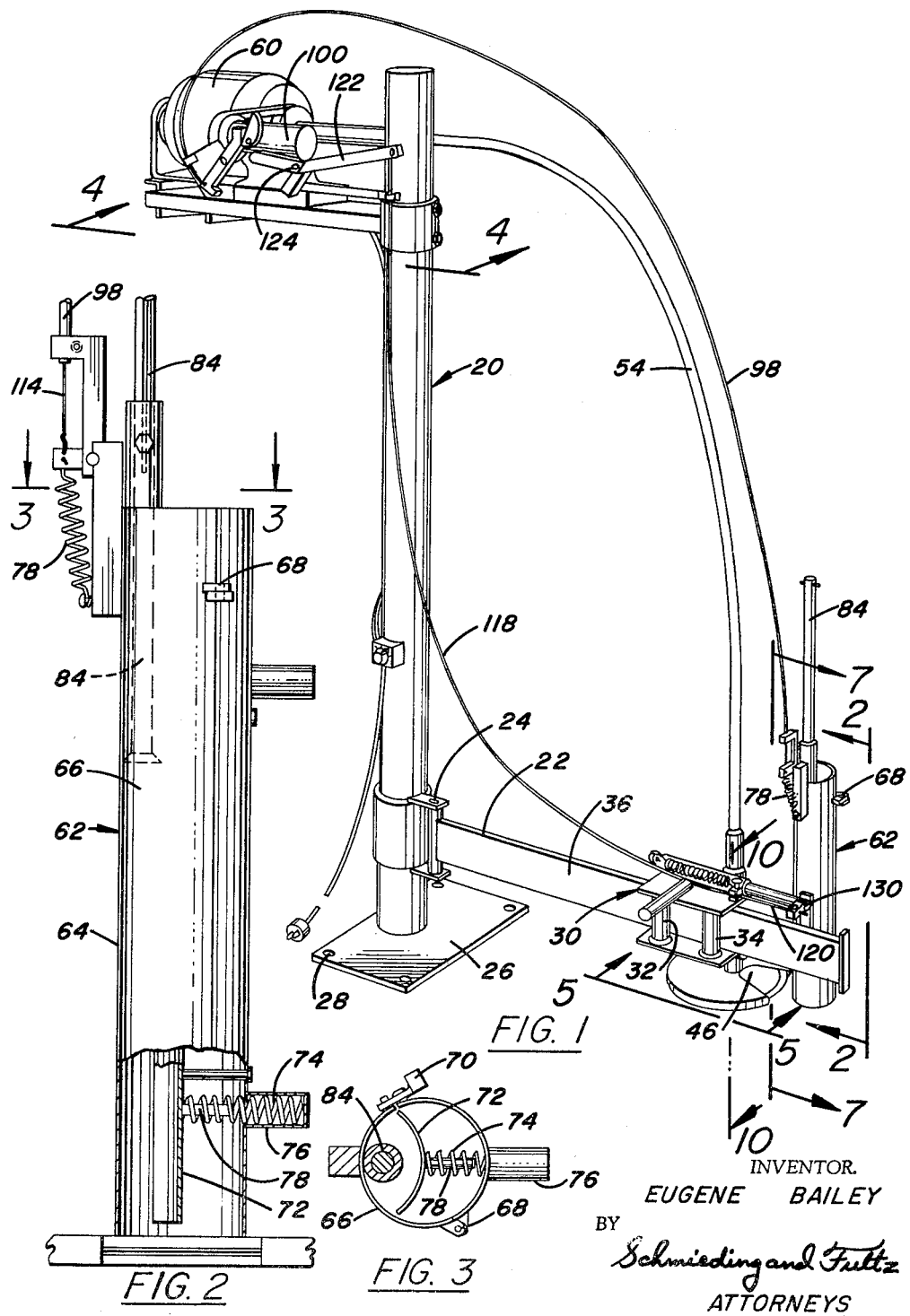

INVENTOR.
EUGENE BAILEY
BY
Schmieding and Fultz
ATTORNEYS

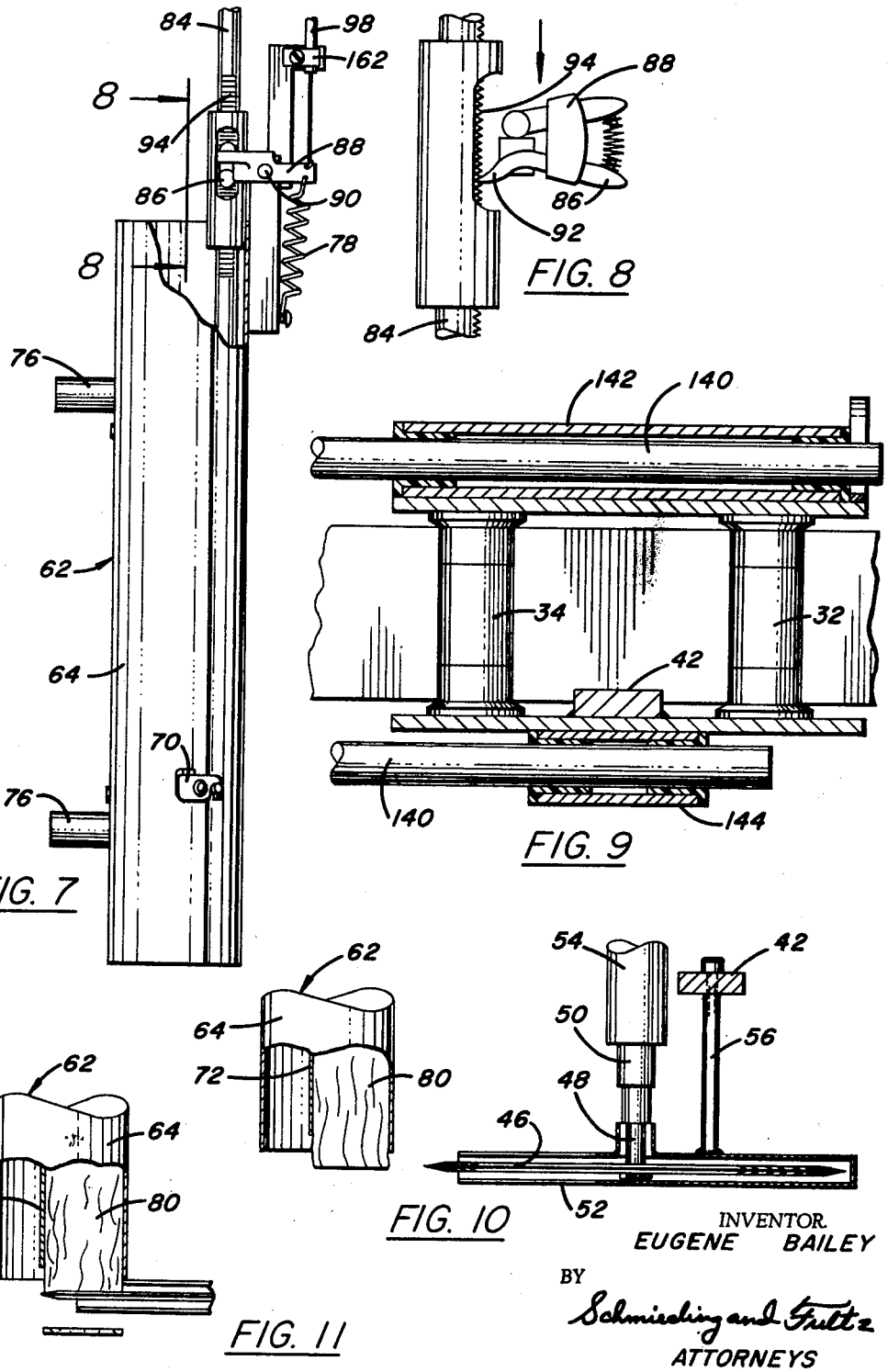

United States Patent Office 3,181,582
Patented May 4, 1965

3,181,582
SLICER
Eugene Bailey, Columbus, Ohio
(2528 Home Road, Grove City, Ohio)
Filed May 10, 1962, Ser. No. 187,326
10 Claims. (Cl. 146—105)

This invention relates to slicing machines for meats or similar food products.

In general, the machine of the present invention is adapted to automatically sever slices from a length of casing type meats such as pepperoni, sausage and the like. And, further, to distribute the slices in any desired pattern or concentration over the top of a pizza pie or other food product.

This machine generally comprises a main frame means in the form of a rigidly mounted vertically extending member. An arm is pivotally mounted on the lower end of the frame means for swinging movement in a horizontal plane and includes a track portion that slideably carries a head means.

A rotary cutter disk is mounted on the head means adjacent the outlet of a meat container, the latter being reciprocated back and forth across the cutting edge of the rotary cutter by a suitable driving means later to be described in detail herein.

The above mentioned container means includes a product advancing means for intermittently advancing and stopping a length of the meat product into a position where it is severed by the rotary cutter.

As the slices are severed from the meat product, the operator reciprocates the head means and laterally swings the arm on which it is mounted and thereby is able to distribute the slices evenly over the pizza pie or other food product.

It is, therefore, an object of the present invention to provide a novel slicing machine that is adapted to automatically drop meat slices and distribute same evenly in any desired pattern and concentration whereby tedious manual labor is eliminated.

Further objects and advantages of the present invention will be apparent from the following description, reference being had to the accompanying drawings wherein a preferred form of embodiment of the invention is clearly shown.

In the drawings:

FIG. 1 is a perspective view of a slicing machine constructed in accordance with the present invention;

FIG. 2 is a partial side elevational view on an enlarged scale of a meat container and product advancing means comprising a portion of the machine of FIG. 1;

FIG. 3 is a top elevational view, partially in section, of the meat container means of FIG. 2;

FIG. 7 is another side elevational view of the meat container of the slicing machine of the present invention;

FIG. 8 is a partial side elevational view of a product advancing means for the meat container of FIG. 7;

FIG. 9 is a partial side sectional view showing a slideable mounting means for the container means of FIG. 7; and FIG. 10 and FIG. 11 are partial side elevational views of the meat container and rotary cutter of the machine of FIG. 1.

Figure 4:
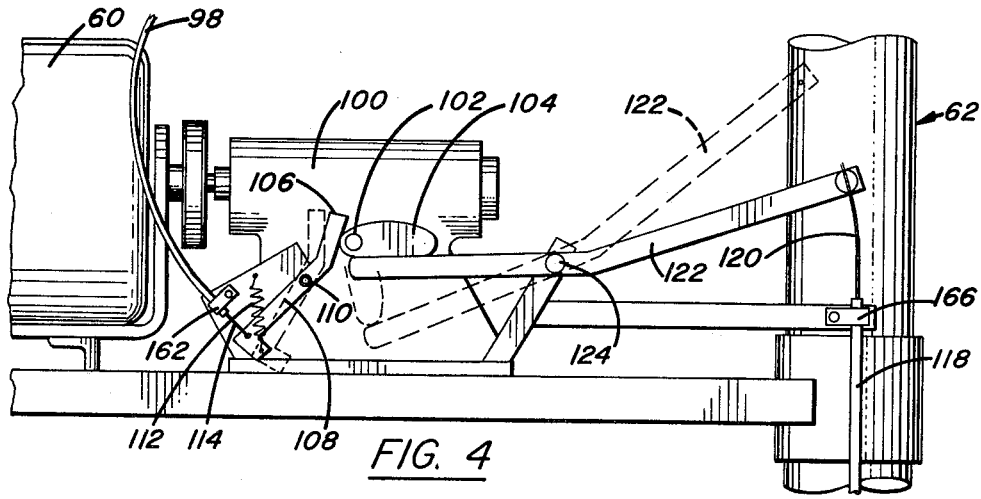
FIG. 4 is a partial side elevational view on an enlarged scale of first and second synchronized driving means embodied in the machine of the present invention.

Referring in detail to the drawings, FIG. 1 illustrates a machine constructed in accordance with the present invention that includes a frame means indicated generally at 20. An arm 22 is pivotally mounted to the frame means for lateral swinging movement at a vertical pivot pin 24.

Frame means 20 includes a base plate 26 provided with holes 28 for securing same to a table top or the like. A head means indicated generally at 30 is slideably mounted on a track portion formed by arm 22 and includes rollers 32 and 34, FIGS. 5 and 6, mounted on vertical pivots on either side of the track portion 36 of arm 22.

The frame of head means 30 comprises an upper horizontal plate 40 and a lower horizontal plate 42 joined by bolts 44 and nuts 45.

With reference to FIGS. 1 and 10, a rotary cutter blade 46 is mounted on a vertically extending shaft 48 that is journaled in a bearing member 50 rigidly mounted on a cutter housing 52, said cutter housing being in turn mounted to lower plate 42 by a brace rod 56.

Rotary cutter 46 is driven by a flexible cable and sheath 54 which connects cutter mounting shaft 58 with the drive shaft of an electric motor 60. See FIGS. 1 and 10.

With reference to FIGS. 1, 2 and 7, the machine further includes a containing and dispensing means for the product to be sliced, said means being indicated generally at 62.

With reference to FIGS. 2 and 3, container means 62 includes a tubular housing 64 provided with a hinged door portion 66 provided with hinges 68 and latches 70. The elongated meat product is frictionally engaged by a vertically extending arcuate guide 72 mounted to the tubular housing 64 by springs 74 mounted in cups 76 and pins 78 welded to arcuate guide 72 and extended into the coils of spring 74.

FIGS. 10 and 11 show a length of pepperoni meat product 80 frictionally retained between arcuate guide 72 and the inner wall of vertical housing 64.

The pepperoni meat product is sequentially advanced downwardly by a push rod 84 that is in turn sequentially advanced downwardly by a dog mounted on a lever 88 that is in turn pivotally mounted to housing 64 at a pivot 90. Dog 86 includes a pointed end 92 that engages a tooth rack portion 94 on push rod 84.

The lever 86 is connected to casing 64 by a tension spring 98 that constantly biases the inner end of the lever and point 92 on the dog upwardly and dog 86 and the inner end of lever 88 are sequentially shifted downwardly, about pivot 90, by a cable and housing assembly 98.

The cable of assembly 98 is cyclically shifted in its sheath by a gear reduction drive 100 that drives a shaft 102 and cam 104, the latter being in engagement with a follower portion 106 of a lever 108 pivotally mounted to the side of the gear reduction assembly at a pivot 110. A tension spring 112 biases follower portion 106 of the lever against cam 104 whereby the cable portion 114 of cable assembly 98 is reciprocated back and forth to drive dog 86 and its lever 88 whereby push rod 84 and the meat product is sequentially advanced downwardly into the path of cutter 46.

Container means 62, and the meat product carried therein, is cyclically reciprocated back and forth, relative to rotary cutter 46, by a sheath and cable assembly 118 that includes an inner cable 120 connected between a lever 122, pivoted to the gear reduction unit at 124, and the container means 62, the latter connection being effected at a cable anchor block 130.

Figure 5:
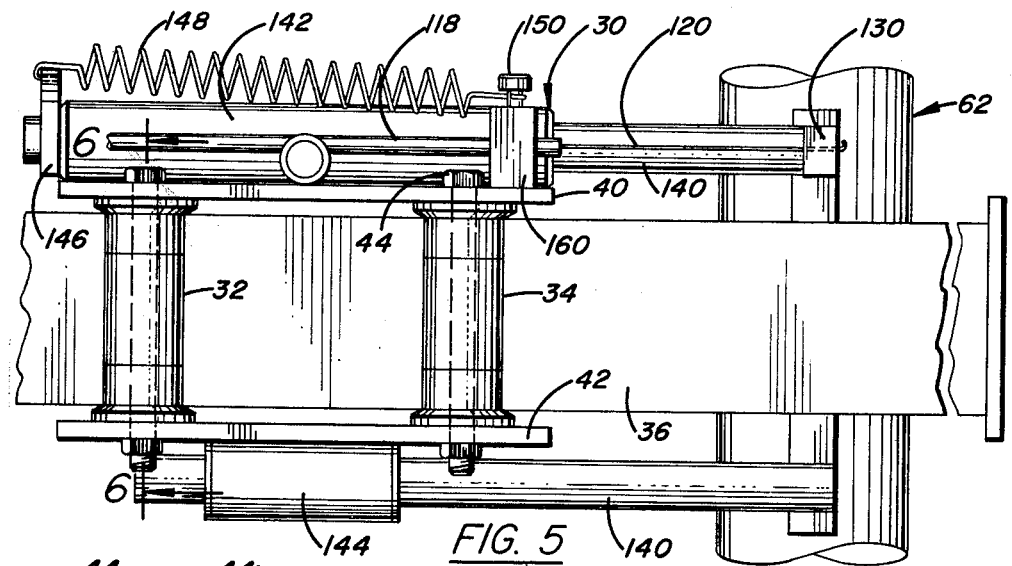
FIG. 5 is a side elevational view on an enlarged scale of an arm and head means assembly of the machine of FIG. 1.
Figure 6:
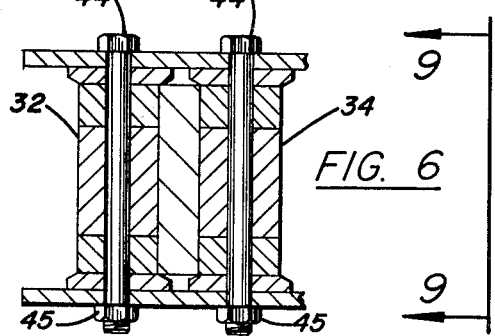
FIG. 6 is a partial and sectional view of the head and track means of FIG. 5.

Container means 62 is mounted for reciprocating movement on head means 30 by means of upper and lower rods 140, FIGS. 5 and 9, which extend through sleeve bearings 142 and 144 welded to upper plate 40 and lower plate 42 respectively.

Rods 140 carry a bracket 146 and a tension spring 148 is connected between the bracket and head means at a mounting pin 150 whereby container means 62 is constantly biased away from rotary cutter 46, that is to the right as viewed in FIG. 5 against the return pulling action of the cam actuated cable assembly 118.

The sheath portion of cable assembly 118 is anchored to the upper plate 40 of head means 30 by means of pin or stud 150 which screws down into a threaded hole in a block 160 and into clamping engagement with the sheath portion of cable assembly 118. The ends of the sheath of cable assembly 98 are retained by clamps 162, FIGS. 4 and 7, and the upper end of cable assembly 118 is mounted to frame means 20 by a clamp 166.

In operation, motor 60 drive shaft 102 of the gear reduction unit 100 and cam 104 in a clockwise direction, FIG. 1, whereby lever 108 pulls cable 114 and actuates the point 92 on dog 86 downwardly. This causes push rod 84 to advance meat product 80, FIGS. 10 and 11, downwardly to a position wherein the thickness of one slice is extended below cutter 46.

Cam 104 continues rotation and depresses the left end of lever 122 downwardly to the dotted position whereby cable 120 slides container means 62 and moves the meat product 80 past the rotating cutting edge of disk 46.

After cam 104 releases the left end of lever 122 tension spring 148 returns rods 140 and container means 62 to the position of FIG. 5 and the machine is ready for the next slicing cycle.

While the slicing is occurring the operator distributes the pieces of meat product, falling from the cutting zone, over the surface of the pizza pie in any desired pattern by pivoting arm 22 to the right and left while sliding the head 30 back and forth along track 36.

While the form of embodiment of the present invention as herein disclosed constitutes a preferred form, it is to be understood that other forms might be adopted, all coming within the scope of the claims which follow:

I claim:

1. A slicing machine comprising, in combination, frame means; a horizontally extending arm including an inner end, an outer end, and a track portion intermediate said ends; means forming a pivotal connection between said inner end of said arm and said frame means whereby said track portion is free to swing laterally about a vertical pivotal axis; head means slideably mounted on said track portion for reciprocation along the horizontally extending longitudinal axis of said arm; rotary cutter means mounted on said head means; container means for a product to be sliced mounted on said head means; a first driving means for reciprocating one of said cutter and container means on said head means for causing cutting engagement between said cutter and said product; product advancing means for intermittently advancing and stopping said product in said container means; and a second driving means for said product advancing means.

2. The machine defined in claim 1 wherein said container means includes a spring pressed guide for frictionally engaging said product.

3. The machine defined in claim 1 wherein said product advancing means includes a plunger slideably mounted in said container means; a plunger driving element engaging said plunger; and a flexible cable connecting said second driving means with said plunger driving element.

4. The machine defined in claim 1 wherein said container means is slideably mounted on said head means and connected to said first driving means for reciprocating movement relative to said cutter means.

5. The machine defined in claim 1 wherein said container means is slideably mounted on said head means and said first driving means is mounted on said frame means; and a flexible member connecting said container means with said first driving means.

6. A slicing machine comprising, in combination, frame means; a horizontally extending arm including an inner end, an outer end, and a track portion intermediate said ends; means forming a pivotal connection between said inner end of said arm and said frame means whereby said track portion is free to swing laterally about a vertical pivotal axis; head means slideably mounted on said track portion for reciprocation along the horizontally extending longitudinal axis of said arm; rotary cutter means mounted on said head means; container means for a product to be sliced mounted on said head means; a first driving means for reciprocating one of said cutter and container means on said head means for causing cutting engagement between said cutter and said product; product advancing means for intermittently advancing and stopping said product in said container means; a second driving means for said product advancing means; and means for synchronizing the reciprocating movement of one of said cutter and container means with the intermittent advancing and stopping movement of said product advancing means.

7. The machine defined in claim 6 wherein said container means includes a spring pressed guide for frictionally engaging said product.

8. The machine defined in claim 6 wherein said product advancing means includes a plunger slideably mounted in said container means; a plunger driving element engaging said plunger; and a flexible cable connecting said second driving means with said plunger driving element.

9. The machine defined in claim 6 wherein said container means is slideably mounted in said head means and connected to said first driving means for reciprocating movement relative to said cutter means.

10. The machine defined in claim 6 wherein said container means is slideably mounted on said head means and said first driving means is mounted on said frame means; and a flexible member connecting said container means with said first driving means.

References Cited by the Examiner

UNITED STATES PATENTS 2,024,933 12/35 Lambert _____ 146—105
2,193,979 3/40 Ott.

J. SPENCER OVERHOLSER, *Primary Examiner*.

LOUIS J. CAPOZI, *Examiner*.